United States Patent [19]
Holz

[11] 3,743,914
[45] July 3, 1973

[54] HALF WAVE VOLTAGE DIVIDER
[75] Inventor: George E. Holz, North Plainfield, N.J.
[73] Assignee: Burroughs Corporation, Detroit, Mich.
[22] Filed: Jan. 17, 1972
[21] Appl. No.: 218,088

[52] U.S. Cl. .................. 320/1, 307/108, 321/8 R
[51] Int. Cl. ...................... H03k 3/57, H02m 7/22
[58] Field of Search ............... 307/109, 108; 320/1; 321/15, 8 R

[56] References Cited
UNITED STATES PATENTS
3,505,586  4/1970  Dulin .................................. 321/15
3,602,795  8/1971  Gunn .................................. 321/15
3,267,299  8/1966  Bartelink ........................... 307/109
3,596,369  8/1971  Dickerson ......................... 320/1 X Primary Examiner—Bernard Konick
Assistant Examiner—Stuart N. Hecker
Attorney—Charles S. Hall

[57] ABSTRACT

An electrical circuit is provided in which a bank of capacitors is controllably charged in series and then discharged in parallel through the interaction of a voltage divider, a silicon controlled rectifier, and diode circuit elements to transform a sinusoidal line voltage into a half-wave pulse. The magnitude of the pulse is a function of the RMS line voltage input and the number of capacitors in the bank. This function may be expressed as $1/(k) \cdot V/n$ where $V$ is the RMS line voltage input, $n$ is the number of capacitors in the banks and $k$ is the transformation and round-off error constant.

7 Claims, 4 Drawing Figures

Patented July 3, 1973

HALF WAVE VOLTAGE DIVIDER

BACKGROUND OF THE INVENTION

Voltage division utilizing an essentially passive circuit to divide a supply voltage into various lesser values has been practiced in the art for some time. The most common form of voltage divider is a series-resistor circuit tapped to supply a different load from a single source voltage. This voltage divider is economical, and does not alter the voltage waveform. However, it is difficult to regulate and it loads down the voltage supply.

Voltage division has also been accomplished by the use of transformers. However, transformer circuits are bulky and require relatively high power and generate sufficient heat to make them unsuitable for some applications.

SUMMARY OF THE INVENTION

An object of this invention, therefore, is to divide a sinusoidal voltage peak magnitude, efficiently and with a minimum of power loss, into a series of output pulses whose magnitude is a function of the divisional factor.

Capacitors of equal value are changed in series and discharged in parallel by applying a reference potential to a diode switching network through a silicon controlled rectifier having its gate tied to the input voltage. The switching of the SCR between conducting and non-conducting states allows the capacitors to charge during one half of the input sinusoidal voltage cycle and to discharge during the other half cycle. The output pulse of this device is a decaying exponential of the frequency of the input, which may be smoothed to a DC level by proper output filtering, and whose magnitude is inversely proportional to the number of capacitors charged.

DESCRIPTION OF PREFERRED EMBODIMENT

Figure 1:
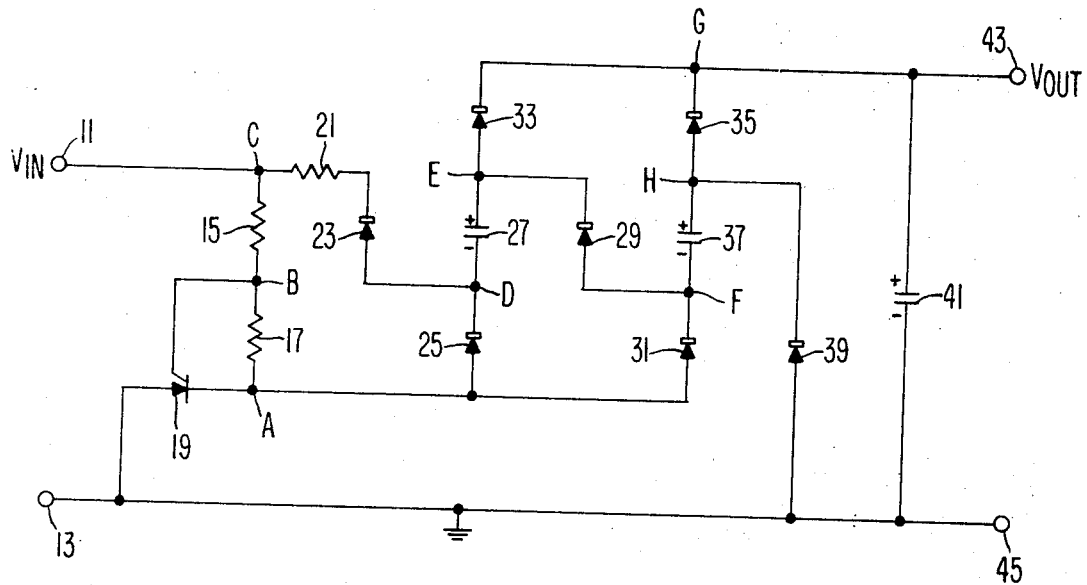
FIG. 1 is a schematic diagram of the preferred embodiment of the invention wherein a sinusoidal peak voltage is divided by a factor of two.

In the preferred embodiment of the invention (FIG. 1), a sinusoidal voltage source V, typically 115 volts AC, is impressed across input terminals 11, 13, the terminal 13 being connected to a reference potential, such as ground. The terminals 11, 13 are serially interconnected by a pair of resistors 15, 17 and a silicon controlled rectifier 19, the anode of the SCR being poled toward the terminal 13 and its connection with resistor 17 being denominated node A. The gate-terminal connection of SCR 19 is connected between the serial resistors 15, 17 forming node B.

In parallel with the pair of resistors 15, 17, are serially connected a resistor 21 and two diodes 23, 25 with diode 23 being connected to resistor 21 and the interconnection between resistors 15, 21 being denominated node C. The diodes 23, 25 are poled with their cathodes toward terminal 11 and the interconnection of these two diodes forms node D.

Capacitor 27 and dioddes 29, 31 are serially connected across diode 25 with capacitor 27 poled with its negative side tied to node D, and the diodes 29, 31 poled with their cathodes toward capacitor 27. The interconnection between capacitor 27 and diode 29 is denominated node E and the interconnection between diodes 29, 31, node F.

From node E to node F, in parallel with diode 29, is a serial connection of diodes 33, 35 and capacitor 37, with diode 33 connected to node E and capacitor 37 tied to node F. The diodes 33, 35 are poled with their cathodes toward their interconnection, which is denominated as node G, and capacitor 37 is poled with its positive side toward its connection to diode 35, this interconnection forming node H.

Diode 39 is interconnected between node H and terminal 13 which is tied to reference potential and is poled with its cathode toward node H. Interconnected between node G and terminal 13 is output capacitor 41, positioned with its plus side connected to node G.

Terminals 43 and 45 are the output terminals of the circuit with terminal 43 being connected to the plus side of capacitor 41 and terminal 45 being tied to the negative side of capacitor 41.

Silicon controlled rectifier 19 is a PNPN semiconductor device. With reverse voltage impressed upon the device SCR 19 blacks the flaw of current up to the breakover point, $V_{bo}$. At this point, the blocking resistance of SCR 19 decreases almost intantaneously to a very low value and current flow through the device is then limited only to the external voltage and circuit impedance. At anode-to-cathode voltage less than $V_{bo}$, SCR 19 can be switched into the high conduction state (turned on) by a low level gate-to-cathode current. SCR 19 can be turned off by reducing the flow of anode current. This is accomplished by reducing the supply voltage to zero, as occurs in every cycle of AC circuits, or by diverting anode current around SCR 19 for the few microseconds required for the device to recover its blacking state.

Resistors 15 and 17 form a voltage divider to limit the gate current $I_g$ to SCR 19. Resistor 17 is chosen small enough to prevent any spurious spikes from triggering SCR 19. Resistor 21 limits the current through the capacitor charging circuit.

The diodes 23, 25, 29, 31, 33, 35 and 39 in the circuit may all be of the same value. The capacitors 27, 37 and 41 in the circuit are preferably of the tantalytic or electrolytic type. The capacitor values of the capacitors 27, 37 in the diode branches should be equal for dividing the input voltage by two. The output capacitor 41, across which the output voltage is discharged, must be of a value to handle the discharge of the voltage stored in capacitors 27 and 37. The capacitors 27, 37 in the capacitor bank will charge in series to the peak input voltage, each capacitor withstanding half this value.

The invention in operation is driven by the input voltage. As the sinusoidal input to terminal 11 swings positive (FIG. 4), current flows through resistors 15 and 17 to node A which is shunted to ground as SCR 19 turns on. No current is flowing in the resistor 21 line of the network because of the blocking action of diode 23. This state continues until the input voltage swings negative. When the input voltage goes negative, SCR 19 turns off and node A floats in the circuit.

With the input at terminal 11 a negative value, and terminal 13 held to ground, the biasing of the diode capacitor link of the circuit is correct for a flow of current from terminal 13 to terminal 11 via the path of diode 39, charging capacitor 37, through diode 29, charging capacitor 27, through diode 23 and resistor 21. There is a total voltage drop of $V_r$ from terminal 13 to terminal 11. At steady state, which begins when the input voltage reaches its negative peak and continues until it crosses the zero axis to a positive value, the capacitors will be charged in series to the peak magnitude of the input voltage, $V_p$, where $V_p$ is V in (RMS) × 1/0.707. Capacitors 27 and 37, being of equal value, will each have one-half of this voltage impressed across them.

During the period when the input voltage is a negative value, there is no current flow through the discharging diodes 25, 31, 33 or 35.

When the input voltage swings to a positive value, SCR 19 is triggered into a conductive state which effectively again shunts node A to ground. When this occurs, there is a current through diodes 25 and 31 from node A to node D and node F, respectively, discharging the negative plates of capacitors 27 and 37 concurrently, which of necessity forces a discharge of the positive plates of capacitors 27 and 37 concurrently. Under these circuit conditions, there is a current flow through diodes 33 and 35 discharging capacitors 27 and 37 in parallel across capacitor 41 and the output terminals 43, 45.

During the positive portion of the input voltage, there is no current flow through the charging diodes 23, 29, and 39.

The output pulse is a decaying exponential whose three sigma value is a function of the time constant of the circuit and whose magnitude is approximately $V_p/2$. By adjusting the magnitude of the output capacitor 41, the output can be smoothed to a DC level approaching $V_p/2$.

Figure 4:
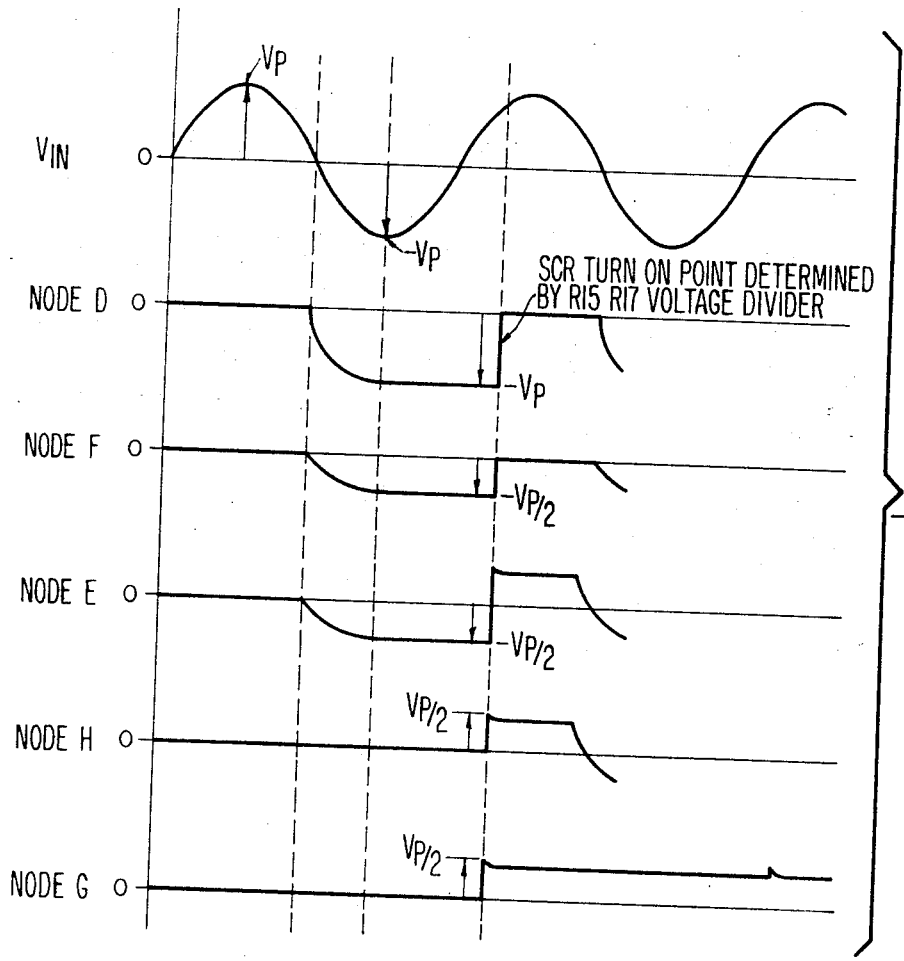
FIG. 4 is a timing diagram for the invention as shown in FIG. 1 wherein voltage is plotted against time at various nodes in the circuit.

It is well to note that SCR 19 does not turn off and turn on instantaneously as the input voltage crosses the zero axis (FIG. 4). There is a few microseconds delay in each instance. This delay is reflected in the discharging of the bank capacitors 27, 37.

Proper circuit component values are chosen for operating in the voltage and frequency ranges of the environment of the circuit. Values for the circuit as shown in the preferred embodiment in a typical circuit environment are:

| | |
|---|---|
| Resistor 15 | 10 ohms |
| Resistor 17 | 25k ohms |
| Resistor 21 | 680 ohms |
| SCR 19 | 250v, 1 amp |
| Capacitor 27 | 20uf, 100v |
| Capacitor 37 | 20uf, 100v |
| Capacitor 41 | 40uf, 100v |
| Diode 23) | |
| Diode 25) | |
| Diode 29) | 1 amp, 500 piv |
| Diode 31) | silicon |
| Diode 33) | |
| Diode 35) | |

Figure 2:
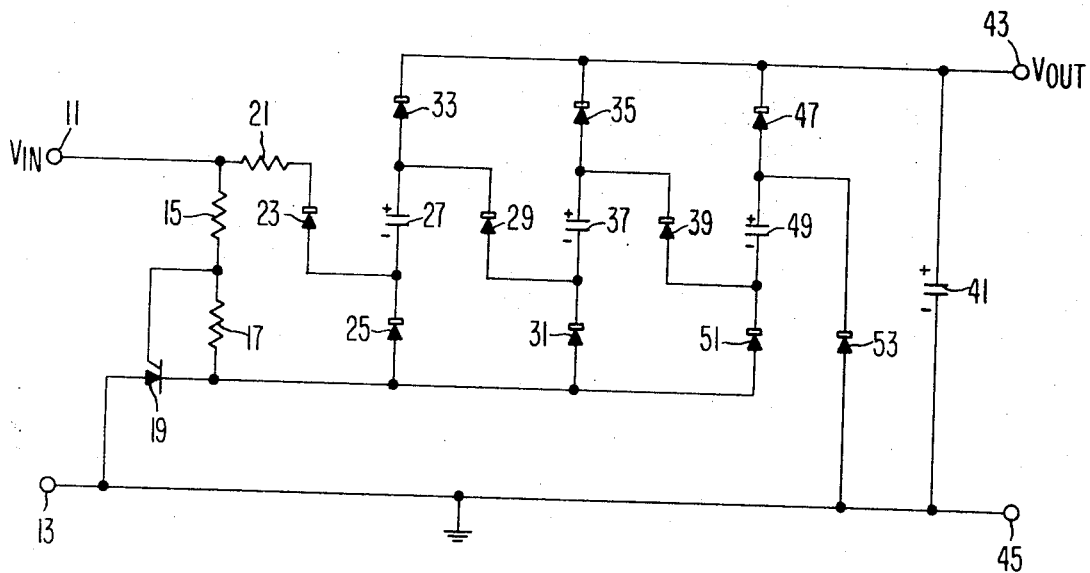
FIG. 2 is a schematic diagram of a modification of the embodiment of FIG. 1 wherein a sinusoidal peak voltage is divided by a factor of three.

An alternate embodiment of the invention (FIG. 2) differs from the preferred embodiment in that there are three capacitors, of equal value, instead of two capacitors, in the capacitor bank.

In the alternate embodiment all the components (with like reference numerals) of the preferred embodiment are utilized with an additional capacitor 49 in the bank with its attendant charging diode 53 and discharging diodes 51, 47. Diode 47, capacitor 49 and diode 51 are connected in parallel with diode 31, capacitor 37 and diode 35 and are similarly poled. The cathode of diode 39 is now connected to the intersection of diode 51 and capacitor 49 and diode 53 interconnects terminal 13 with the junction of capacitor 49 and diode 47. In the circuit of the alternate embodiment, there is the serial charging of capacitors 27, 37, and 49 so that the divisional factor is 3, and with an input peak magnitude of $V_p$ the output magnitude is $V_p/3$. The output of this embodiment has the same waveform and period as the output of the preferred embodiment described herein.

A logical extension of the embodiments described herein is the N-dimensional general configuration wherein the divisional factor is N. In this general configuration there are N capcitors in the capacitor bank. With an input voltage peak magnitude of $V_p$, the output magnitude is $V_{p/N}$, and this output has the same waveform and period as the preferred embodiment.

The general N-configuration could be extended to include the capability of switching into and out of the capacitor bank, additional capacitors to change the divisional factor of the circuit as needed. A simple switching network could be included to add capacitors and their associated diode circuitry to the capacitor bank. In each instance, the output waveform and period would remain constant for a given input to the circuit and the magnitude would vary inversely to the number of capacitors in the bank.

Figure 3:
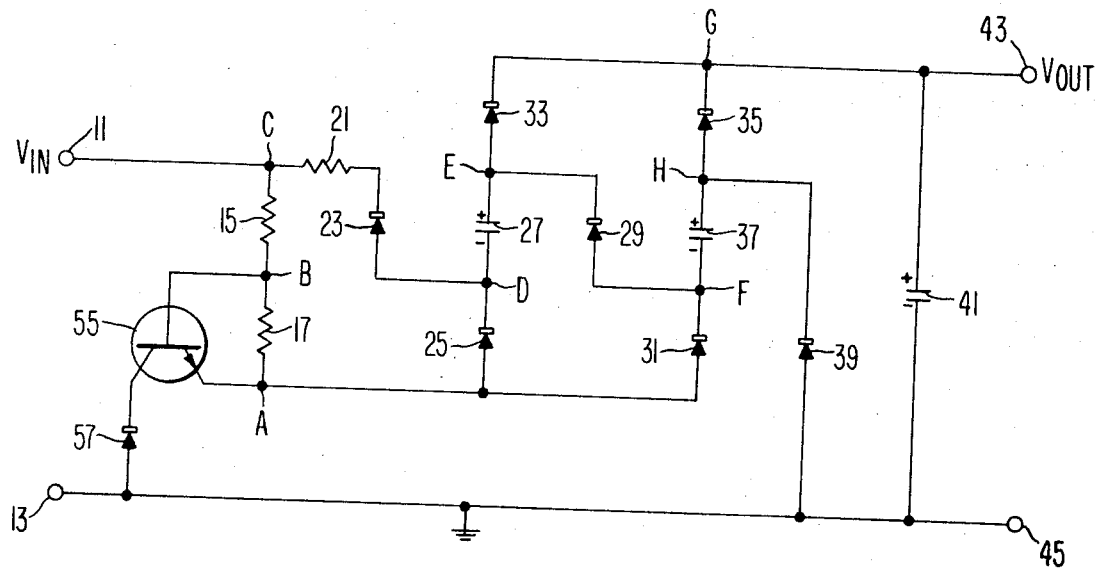
FIG. 3 is a schematic diagram of a modification of the embodiment of FIG. 1 wherein a transistor switch is substituted for the SCR switch.

A second alternate embodiment of the invention (FIG. 3) differs from the preferred embodiment in that a transistor 55 with its associated collector diode 57 is substituted for the SCR 19. Under some load conditions difficulty may be experienced in turning off the SCR 19. The substitution of the equivalent transistor circuit and readjustment of R15 and R17 eliminates the SCR turn off problem. In this configuration wherein the substitution of a transistor is made, the circuit waveforms are essentially identical to the configuration with the SCR, except, the pulses have slower rise and fall times and therefore less noise is generated in the circuit.

What is claimed is:

1. A voltage reducing rectifier circuit for an alternating voltage source with respect to a reference potential comprising:
   a plurality of capacitors;
   a plurality of passive unidirectional means for connecting said capacitors in series between said reference potential and said alternating voltage source, each of said plurality of capacitors being connected between successive ones of said passive unidirectional means for charging said plurality of capacitors during a half-cycle of said alternating voltage source;
   a plurality of pairs of passive unidirectional means connected in parallel as an output circuit, each of said plurality of capacitors being also respectively connected between individual ones of said pairs of passive unidirectional means; and
   a single gate-controlled, gating means sensitive to the phase and magnitude of said alternating voltage source and connected to said output circuit, for completing a circuit for permitting discharge current to flow between said reference potential and said output circuit only during the other half-cycle of said voltage source.

2. The circuit of claim 1 wherein each of said unidirectional means includes a diode and wherein said plurality of capacitors are of equal value.

3. The circuit of claim 1 further including an output capacitor connected in parallel with said output circuit and said single gating means.

4. The circuit of claim 1 wherein said gating means includes controlled rectifier gating means.

5. The circuit of claim 4 including a voltage divider connected between said voltage source and said controlled rectifier gating means, said controlled rectifier gating means including a silicon controlled rectifier and said rectifier having its gate tied to an intermediate point of said voltage divider.

6. The circuit of claim 1 wherein said gating means includes transistor gating means.

7. The circuit of claim 6 wherein said transistor gating means includes a transistor and the rectifier circuit also includes a resistive voltage divider connected between said voltage source and said transistor and wherein said transistor has an emitter connected to an end of said divider and to said output circuit, a base connected to a mid-point of said divider, and a collector unidirectionally connected to said reference potential.

* * * * *